United States Patent
Hindkjær

(10) Patent No.: US 10,190,001 B2
(45) Date of Patent: Jan. 29, 2019

(54) IR REFLECTIVE SURFACE TREATMENT

(71) Applicant: ARS Holding Kolding A/S, Kolding (DK)

(72) Inventor: Jakob Thomas Hindkjær, Kolding (DK)

(73) Assignee: ARS HOLDING KOLDING A/S, Kolding (DK)

( * ) Notice: Subject to any disclaimer, the term of this patent is extended or adjusted under 35 U.S.C. 154(b) by 0 days.

(21) Appl. No.: 15/490,704

(22) Filed: Apr. 18, 2017

(65) Prior Publication Data
US 2017/0355859 A1    Dec. 14, 2017

(30) Foreign Application Priority Data

Jun. 13, 2016   (DK) .................................. 2016 70423

(51) Int. Cl.
| | |
|---|---|
| C09D 5/33 | (2006.01) |
| C09D 133/02 | (2006.01) |
| C09D 133/08 | (2006.01) |
| C09D 5/03 | (2006.01) |
| C09D 7/61 | (2018.01) |
| C09D 7/40 | (2018.01) |

(52) U.S. Cl.
CPC .............. *C09D 5/004* (2013.01); *C09D 5/033* (2013.01); *C09D 7/61* (2018.01); *C09D 7/68* (2018.01); *C09D 7/69* (2018.01); *C09D 133/02* (2013.01); *C09D 133/08* (2013.01)

(58) Field of Classification Search
CPC .... C09D 5/004; C09D 7/1216; C09D 7/1275; C09D 7/1283; C09D 133/02; C09D 133/08
See application file for complete search history.

(56) References Cited

U.S. PATENT DOCUMENTS

| | | | | | |
|---|---|---|---|---|---|
| 4,704,429 | A | * | 11/1987 | Hackett | A47L 11/145 106/10 |
| 5,907,003 | A | * | 5/1999 | Blot | C08F 283/01 427/137 |
| 6,366,397 | B1 | | 4/2002 | Genjima et al. | |
| 2013/0089706 | A1 | * | 4/2013 | Wen | C09D 7/12 428/143 |
| 2014/0121297 | A1 | | 5/2014 | Desphy | |

FOREIGN PATENT DOCUMENTS

| | | | | | |
|---|---|---|---|---|---|
| CN | 103952020 | | * | 7/2014 | ............... C09D 4/02 |
| CN | 105363396 | A | | 3/2016 | |
| CN | 105542636 | | | 5/2016 | |
| EP | 2578650 | A1 | | 4/2013 | |

OTHER PUBLICATIONS

Office Action from Danish Patent Office dated Mar. 25, 2017 in Danish Patent Application No. 201670423.
European Search Report dated Oct. 4, 2017, in European Application No. 17168327.9.

* cited by examiner

*Primary Examiner* — Bijan Ahvazi
(74) *Attorney, Agent, or Firm* — Berg Hill Greenleaf Ruscitti LLC

(57) ABSTRACT

A water-based solvent-free and IR reflecting surface treatment composition is disclosed. In one or more embodiments, the composition includes: (1) a base comprising (a) 30 to 60% by weight of an acrylic resin; (b) 1 to 10% by weight of an alkyd resin; (c) 0.1 to 2% by weight of a polyolefin; (d) 0.1 to 1% by weight of an ammonium salt; (e) less than 0.1% by weight of a preservative; (f) water such that base reaches 100 % by weight; and (2) a paste comprising (i) metal oxides having a mean particle size between 0.05 and 5 μm; and (ii) a polymeric binder.

7 Claims, No Drawings

IR REFLECTIVE SURFACE TREATMENT

CROSS REFERENCE TO RELATED APPLICATIONS

This application claims priority to Denmark Patent Application No. 201670423, which was filed on 5 Jun. 13, 2016 and is hereby incorporated in its entirety by reference.

FIELD OF THE INVENTION

The present invention relates to a water-based, solvent-free and IR-reflecting surface treatment composition such as a paint or wood-stain as well as a method of manufacturing the water-based solvent-free and IR-reflecting surface treatment composition.

BACKGROUND OF THE INVENTION

It is known in the art to use infra-red (IR) reflecting paints in order to reduce the temperature rise on a roof or wall which is exposed to solar radiation.

When the sun shines on the surface of a building such as walls or roofs the temperature of the exterior walls and roofs will increase. Eventually the accumulated heat will depending on the level of insulation transgress to the interior such that also the interior of the building will be heated from the IR radiation. This phenomenon is due to the fact that the IR portion of the solar radiation (high-wave lengths from 700-2,500 nm) is absorbed by the exterior surfaces such as roofs and walls of the building and eventually transmitted to the interior of the building.

In order to lessen this impact the walls or roofs may be painted white or made from light coloured materials as the lighter colours are more effective in reflecting also the IR spectrum. However, most colours contain carbon black to a higher or lesser degree depending on the nuance/hue of the colour, and as such due to the carbon black will absorb IR radiation across the solar spectrum.

In this context it should be noted that by IR reflective properties is meant that the paint composition when dry and applied to a building surface such as a roof or a wall will reflect more of the sun's radiation and thereby give rise to a lesser temperature increase than a non IR-reflective paint of the same colour.

It is clear that the more reflective the coating is, the lower the temperature of the panel surface will become.

A further aspect is the environmental aspect in that the use of solvents creates a host of hazards for the people applying the paint compositions as well as a potential pollution problem when discarding the remains of leftovers of the paint. Furthermore, during the manufacturing process substantial and often costly environmental issues have to be addressed in order to manufacture the compositions in an environmentally safe manner not exposing either the environment or personnel working in the manufacture of such paint to hazardous conditions stemming from the ingredients in the paints and in particular the very volatile solvents used in traditional paints.

OBJECT OF THE INVENTION

Hence there is a desire for an environmentally friendly paint composition which at the same time has a very high and significantly higher reflective capability than prior art compositions, such that the paint will be very good at reflecting particularly the infrared portion of the solar radiation.

DESCRIPTION OF THE INVENTION

The invention addresses this by providing a water-based solvent-free and IR reflecting surface treatment composition consisting of the following compounds:
a base comprising
   a. 30 to 60% by weight of an acrylic resin;
   b. 1 to 10% by weight of an alkyd resin;
   c. 0.1 to 2% by weight of a polyolefin;
   d. 0.1 to 1% by weight of an ammonium salt;
   e. Less than 0.1% by weight of a preservative;
   f. Water such that base reaches 100% by weight:
and
a paste comprising
   i. metal oxides having a mean particle size between 0.05 and 5 μm
   ii. a polymeric binder In this context surface treatment shall be understood to at least encompass paint and wood stains.

A wood stain typically contains of a colorant suspended or dissolved in an agent or solvent. The suspension agent can be water, alcohol, petroleum or other fluid. Coloured or stained finishes like polyurethane do not penetrate the cellular structure of the wood to any significant degree and will disappear when the finish itself deteriorates or is removed intentionally. Pigments and dyes are largely used as colorants; the difference between the two is in the size of the particles. Dyes are microscopic crystals that dissolve in the vehicle, i.e. in the agent or solvent, whereas pigments are suspended in the vehicle and much larger in size. Dyes will colour very fine-grained wood, whereas pigments of larger size would not be able to penetrate the wood structure of the fine-grained wood. Therefore, wood stains containing pigments will also contain a binder in order to help the composition attach itself to the wood.

Paint on the other hand is any liquid, liquefiable or mastic composition that after application to a substrate in a thin layer converse to a solid film. It is most commonly used to protect, to colour or to provide texture to objects such as for example walls. Paints can be manufactured in many colours and in many different types such as water colours, synthetic colour etc.

With the present invention, by providing a base in combination with the paste it is achieved that the base may be coloured/dyed in any desirable colour, whereas the paste comprising the metal oxides will provide the IR-reflective properties. The paste, as is evident from the method of manufacture, is created by grinding the metal oxides in an industrial grinding mill, such as for example a Dynomill. When the polymeric binder is added to the grinding process the polymeric binder will coat the very fine metal oxides, such that when the paste is mixed with the base and applied to a surface, the polymer coated metal oxides will harden/dry in a manner such that the metal oxides will be distributed in a substantially very thin/single layer providing IR-reflective characteristics to the entire surface.

The polymeric binder may be a mixture of acrylic resin, alkyd resin and mineral oil.

In addition to providing IR-reflective properties, the addition of polymer-coated metal oxides to the base will also provide a longer-lasting and more true colour composition than comparable paints are able to under the same conditions.

As is evident, the base does not comprise any solvents or other dilutions which are volatile or hazardous and as such the water-based surface-treatment composition according to the present invention is very environmentally friendly and fulfils all the requirements for water-based solutions which are to be used without special precautions.

In an embodiment one or more of the further ingredients are added
g. 0.1 to 2% by weight of hydroxycellulose;
h. 0 to 0.5 by weight of ammonia;
i. 1 to 5% by weight of a wax;
j. 1 to 5% by weight of one or more minerals selected from a MICA group of minerals;
k. 0.1 to 20% by weight of titanium dioxide;
l. 0.1 to 1% by weight of a thickener;

By adding these extra ingredients a more "paint-like" composition is achieved which will exhibit characteristics normally expected from surface paints.

The titanium dioxide is normally only used with white or very light hues, due to titandioxides very white color.

Various tests in developing the water-based solvent-free surface treatment composition have shown that a wide variety of ingredients from the different material groups may be used.

The acrylic resin used with the present invention is typically selected from a group of substances derived from acrylic acid, metacrylic acid or other related compounds. Particularly polymethylacrylate is an acrylic resin used in an emulsified form which may be advantageous with the present invention. Only water soluble acrylic resins are used with the present invention and a particularly advantageous resin has CAS NO: 1240506-83-5.

An alkyd is a polyester modified by the addition of fatty acids and other components. They are derived from polyols and a dicarboxylic acid or carboxylic acid anhydride.

The term alkyd is a modification of the original name "alcid", reflecting the fact that they are derived from alcohol and organic acids. The inclusion of the fatty acid confers a tendency to form flexible coating. Alkyds are used in paints and in moulds for casting. They are the dominant resin or "binder" in most commercial "oil-based" coatings. However in the concentrations suggested with the present invention they do not act as the dominant binder. An alkyd having CAS no 63148-69-6 or 308061-71-4 is advantageous with the present invention.

Typical mineral oils used for paint manufacture may be used, however a preferred mineral oil has CAS NO 8012-95-1. The mineral oil mainly has an anti-foam function.

In order to control the consistency of the mixture hydroxycellulose may be added. Hydroxycellulose is typically a cellulose and/or carboxymethylether compound preferably a hydroxycellulose having a CAS no 9000-11-7 is used.

An important aspect to control with surface treatment compounds such as paints or wood stains, is their ability to produce a film, and not make film while still in the pot. The film is the surface of the layer of paint/wood stain exposed to ambient air. In order to control this polyolefin, and in particular a polyolefin with CAS no 9002-88-4 may be used.

The wax used is preferably a wax based on paraffin. The wax is a resin and as such is an important constituent in the surface treatment composition as such. When the wax is paraffin based it will readily mix with the mineral oil. A mineral oil having CAS no 8002-74-2 has proven to be very useful.

The mica group represents 37 phyllosilicate minerals that have a layered or platy texture. The commercially important micas are muscovite and phlogopite, which are used in a variety of applications. Mica's value is based on several of its unique physical properties. The crystalline structure of mica forms layers that can be split or delaminated into thin sheets usually causing foliation in rocks. These sheets are chemically inert, dielectric, elastic, flexible, hydrophilic, insulating, lightweight, platy, reflective, refractive, resilient, and range in opacity from transparent to opaque. Mica is stable when exposed to electricity, light, moisture, and extreme temperatures. With the present invention Mica sold under the tradename Aspanger HF has proven very useful.

Titanium dioxide is a white compound, and preferably a Titanium dioxide having CAS no 13463-67-7 is advantageously used with the present invention.

The ammonium salt is a highly carboxylated acrylic polymer, for example as CAS no 84014-14-2. The ammonium salt is a dispersion agent, creating a more homogenous compound.

The thickener is added in order to control the consistency of the surface treatment composition, such that working with the composition is made more convenient. The thickener may advantageously further provide thixotropic characteristics to the composition. A preferred compound is a liquid acrylic non-associative thickener providing a strong pseudoplastic rheologic profile to the otherwise water-based system, for example a compound selected from CAS no 1360738-98-2.

To the base as described above may be added a pigment paste in any desired colour/hue. The pigment paste will typically contain metaloxides and a polymer, forming a metaloxide polymer matrix. The metal oxide is preferably selected from an oxide collection consisting of iron.

The polymer matrix is a mixture of for example a reaction among metaloxides (25-50%), and 0,1 to 5% of a block polymeric wetting and dispersing agent, consisting of 62% C2 polyether, 23% C3 polyether and 15 polystyrene blocks, having CAS no 216303-28-5, and 0,1 to 2% of a non-silicone polymeric defoamer, such as selected from CAS no 107720-81-0, the mixture further added up to 100% with an acrylic-alkyd mineral oil resin. The polymer matrix will typically have a particle size between 0,1 and 5 µm.

The invention is also directed at a method of manufacturing the water-based solvent-free and IR reflecting surface treatment composition as described above wherein in
a first process a base consisting of at least components a. through f is mixed; where water is added in order to achieve the desired consistency/flowability;
and
a second process wherein metal-oxides and a binder are treated in a grinding mill to a mean particle size of 0.1-5 µm at a temperature controlled between 5° C. and 35° C.;
and
combining and mixing the fluid obtained from the first process with the paste obtained from the second process
a. 0 to 2% by weight of a mineral oil;
b. 0,1 to 2% by weight of hydroxycellulose
c. 0 to 0,5 by weight of ammonia;
d. 1 to 5% by weight of a wax;
e. 1 to 5% by weight of one or more minerals selected from a MICA group of minerals;
f. 0,1 to 20% by weight of titandioxid;
g. 0,1 to 1% by weight of a thickener;

In the first process the mixing is carried out in a standard industrial mixer/stirrer used in traditional paint manufacture. The ingredients are added and blended/mixed until a smooth, homogeneous liquid is created. The consistency, i.e. viscosity is adjusted by adding more or less water.

In the second process the metal oxides are blended with a binder. The binder is polymer based. The mix is introduced into the grinder. In production a Dynamill is used. The metal oxide particles are grinded to very minute particles having particle sizes between 0,05 to 5 µm. In practice particle sizes in the range 0,5 to 2 µm are aimed at. The grinding process facilitates that the metal oxides during the grinding process is provided with a very large surface. By furthermore controlling the temperature in the grinder such that it does not exceed 35° C. it is assured that the polymer does not "burn" i.e. is damaged by the process. The cooling is achieved by circulating ice water through the grinder. The polymer will coat the very fine particles and due to the polymers chemical "open" surface, it will readily connect to other polymer coated oxide particles. This is the mechanism which when the treatment composition, whether it being a paint, wood stain or other treatment composition, is applied to a surface will comprise a substantially continuous very thin layer (few metal oxide particles thick) of overlapping metal oxide particles. This substantially continuous layer of metal oxides, provides the IR reflective properties, and at the same time provides the color intensity and long lasting effect of the surface treatment layer.

The longer lasting life expectancy of the surface treatment together with the improved color depth/hue intensity is achieved with much less color pigment than for comparable surface treatment compositions. Tests indicate that 10 to 40% less pigment is used in order to achieve the same or better qualities as compared to similar surface treatment compositions.

The invention claimed is:

1. A water-based IR reflecting surface treatment composition of the following compounds:
    a base comprising:
        a. 30 to 60% by weight of an acrylic resin;
        b. 1 to 10% by weight of an alkyd resin;
        c. 0.1 to 2% by weight of a polyolefin;
        d. 0.1 to 1% by weight of an ammonium salt, wherein the ammonium salt comprises a carboxylated acrylic polymers;
        e. Less than 0.1% by weight of a preservative;
        f. Water such that base reaches 100% by weight; and
    a paste comprising:
        i. metal oxides having a mean particle size between 0.05 and 5 µm;
        ii. a polymeric binder; and
    wherein the water-based IR reflecting surface treatment composition is applied to an exterior surface of a building.

2. The water-based IR reflecting surface treatment composition according to claim 1, wherein one or more of the further ingredients are added:
    g. 0.1 to 2% by weight of hydroxy cellulose;
    h. 0 to 0.5 by weight of ammonia;
    i. 1 to 5% by weight of a wax;
    j. 1 to 5% by weight of one or more minerals selected from a mica group of minerals;
    k. 0.1 to 20% by weight of titanium dioxide;
    l. 0.1 to 1% by weight of a thickener.

3. The water-based IR reflecting surface treatment composition according to claim 1, wherein the polymeric binder is a mixture of acrylic resin, alkyd resin and mineral oil.

4. The water-based IR reflecting surface treatment composition according to claim 1, wherein the composition is in the form of a paint suitable to paint outdoor surfaces of buildings or other building components.

5. The water-based IR reflecting surface treatment composition according to claim 1, wherein the composition is in the form of a wood stain, suitable for surface treatment of outdoor wood surfaces.

6. The water-based IR reflecting surface treatment composition according to claim 1, further including wax and wherein the mineral oil and the wax is paraffin-based.

7. A method of manufacturing the water-based IR reflecting surface treatment composition according to claim 1, wherein in
    a first process a base consisting of at least components a. through f. is mixed; where water is added in order to achieve the desired consistency and flowability; and
    a second process wherein metal-oxides and a binder are treated in a grinding mill to a mean particle size of 0.1 -5 µm at a temperature controlled between 5° C. and 35° C.; and
    combining and mixing the fluid obtained from the first process with the paste obtained from the second process.

* * * * *